APPLYING SUBBING LAYER ONTO OLEFIN POLYMERIC FILMS BY GRAFT POLYMERIZATION USING ULTRA-VIOLET RADIATION
Filed Oct. 24, 1961
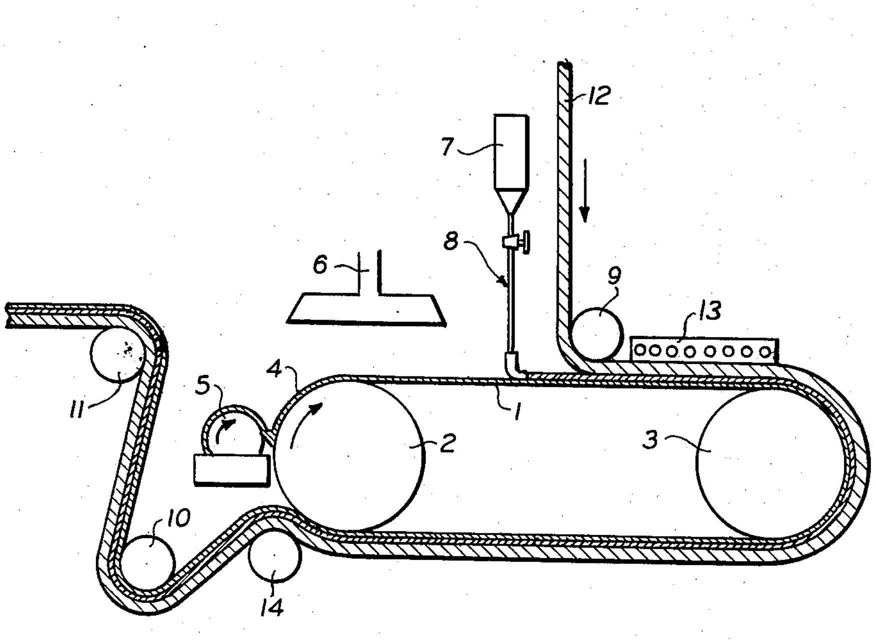
INVENTORS
GIOVANNI PARASACCO
GIOVANNI FARAONE
BY
Maurice B. Stiefel
ATTORNEY United States Patent Office 3,250,642

Patented May 10, 1966

3,250,642

APPLYING SUBBING LAYER ONTO OLEFIN POLYMERIC FILMS BY GRAFT POLYMERIZATION USING ULTRA-VIOLET RADIATION

Giovanni Parasacco, Torino, and Giovanni Faraone, Ferrania, Savona, Italy, assignors to Montecatini Societa Generale per l'Industria Mineraria e Chimica, Milan, Italy, and Societa per Azioni Ferrania, Milan, Italy, both corporations of Italy Filed Oct. 24, 1961, Ser. No. 147,279
Claims priority, application Italy, Oct. 26, 1960, 18,495/60
3 Claims. (Cl. 117—93.31)

The present invention relates to a continuous process for applying subbing layers onto foils or films made of high polymers which may be used, for example, as supports for photosensitive layers.

It is known in the art that the application of subbing layers onto supports for photosensitive layers is carried out by applying onto the support a dispersion of gelatin or another hydrophylic colloid in organic solvent capable of anchoring the colloid to the support itself.

There are, however, supports (e.g., made of polystyrene, polyesters, etc.) which, due to their nature or to the treatments to which they have been subjected, are not attacked at all by the solvents commonly used for the dispersions of hydrophylic colloids and other supports which, on the contrary, are damaged by the said solvents. Therefore in these cases recourse must be had to other techniques for the application of the subbing layers.

These techniques include, for example, the use of layers of nitrocellulose or of other cellulose esters and ethers, the use of layers of copolymers of two or more vinylic and acrylic monomers. These above-mentioned layers have good adhesion with the afore-mentioned supports and can be attacked by the solvents for the hydrophylic cololid dispersions in order to achieve adhesion with the photosensitive layer.

There are, however, some supports belonging to the class of polyolefins, such as for example, polyethylene and polypropylene, with which these aforedescribed techniques do not produce good results.

An object of the present invention is therefore the production of a subbing layer in particular for this type of polyolefin support, wherein the adhesion is caused by bonds of a chemical nature rather than being due to the traditional type of adhesive forces.

Other objects and advantages will become apparent as the disclosure proceeds.

The drawing is a schematic representation of a suitable means for carrying out the present invention.

More particularly, the present invention is achieved by grafting, onto the support polymer, polyfunctional monomers also capable of reacting, under suitable conditions, with the upper layer of hydrophylic colloid.

It is known in the art that luminous energy, in particular that of ultraviolet light, has the ability to catalyze the polymerization reactions of unsaturated compounds and that this action is considerably increased in the presence of suitable sensitizers.

In this regard may be mentioned the work of R. Pummerer and H. Kehlen (Ber. 66, II, pages 1107–1122 (1933)) wherein the fundamental importance of the use of particular sensitizers belonging to the class of aliphatic and/or aromatic ketones is demonstrated. In said work, the determining action of the carbonyl group, which is responsible for the activation (by means of luminous energy) of unsaturated molecules is pointed out.

In carrying out the grafting technique, i.e., in the grafting of a momomer onto a pre-formed polymer, it is noted that an activation system similar to that described above gives positive results, since in our case it is also true that the action of ultraviolet light on the carbonyl compounds causes the formation of activating compounds for the monomer and the polymer (see, I. E. Guillet, R. G. W. Norrish, "The Photolysis of Polymethylvinylketone"; "The Preparation of Graft-Polymers," Proc. Roy. Soc. London 233, 172 (1956); B. R. Chinmaynandam, H. W. Melville, "Photosensitive of Polymerization Reactions," Trans. Farad. Soc. 50, (1954), 73–82).

On the basis of these general principles, a new technique for the application of subbing layers has now been developed. This technique is suitable for films of high polymers, more particularly olefin polymers, which polymers have surfaces which are not suitable for adhesion with the hydrophylic colloid layer when using traditional methods.

The process according to the present invention can be carried out by using mixtures comprising at least one hydrophobic polyfunctional monomer and at least one hydrophylic mono- or polyfunctional monomer. Preferred hydrophobic monomers contain one or more ethylenic unsaturations and one or more epoxy groups.

Among these hydrophobic monomers there can be mentioned glycidyl-methacrylate and glycidyl-ethers of hydroxy-alkyl vinyl ethers.

Among the highly hydrophylic monomers there can be mentioned acrylic acid, acrylamide, methacrylic acid, methacrylamide, maleic acid, itaconic acid, crontic acid and their amides.

These mixtures of monomers, in fact, can be grafted on one side onto the support polymer by ultraviolet irradiation in the presence of sensitizers while, on the other side, they can simultaneously form chemical bonds through the epoxy groups with the functional groups of the gelatin or of another hydrophylic colloid substance (such as casein, zein, albumin and polyvinyl alcohol) which substance is thereby firmly anchored to the support polymer.

As the U.V. source, 15–W CGE lamps are employed.

Benzophenone, 4-chlorobenzophenone, 4,4'-dimethylbenzophenone, benzaldehyde, benzoin are some examples of suitable sensitizers. They are used in proportion of 0.5% to 5% by weight of the monomer mixture.

In practice, benzophenone is generally used in most tests, since it gives the best results due to its particular sensitivity to U.V. rays, thus allowing a reduction in the irradiation time.

When uing a distance of 1 cm. between the specimen and the U.V. lamp, an irradiation of 5 minutes is sufficient for effecting the grafting reaction.

The accompanying drawing schematically represents, by way of example, one type of the apparatus suitable for carrying out the present invention.

The drawing is a schematical view of an apparatus for applying subbing layers to supports made of olefin polymers, as explained as follows.

The apparatus according to one embodiment of the present invention comprises a continuous belt 1, made of a material such as stainless steel so as to avoid any adhesion between the belt and the hydrophylic colloid layer to be applied thereon. The belt rotates on rolls 2 and 3 in the direction shown by the arrow.

A thin layer 4 of gelatin is spread onto said belt 1 from an aqueous solution by means of doctor roller 5. Layer 4 is dried by heating system 6, which may be an infrared lamp series, an electric resistance or other suitable means not shown in the drawing. Onto gelatin layer 4 the monomer mixture containing in solution the U.V. sensitizer, is poured from vessel 7 by a laying system 8.

By means of the system of rolls 9, 10, and 11 the polyolefin film (onto which the subbing layer is applied) is deposited onto belt 1 using sufficient pressure to exclude gas pockets. Film 12 under roll 9 is thus contacted with the gelatin layer wetted with the monomers. The radiations from an U.V. lamp series 13 causes the polymerization of the monomers and their grafting onto film 12 during the operation of the process. Simultaneously, therewith the reaction of the epoxy groups contained in the copolymer thus formed, takes place with the gelatin substratum.

The speed of the system obviously depends on the exposure time required for completing the above reactions.

At point 14, the polyolefin film leaving belt 1 is coated with a gelatin layer firmly anchored thereto.

The size and, more particularly, the thickness of the various layers of the film were modified in the drawing for ease of interpretation.

The film thus treated is therefore ready to receive the layer of photosensitive emulsion.

The following examples show suitable compositions and the conditions for the application of subbing layers according to the present invention, but are not intended to limit the scope of the present invention since other suitable compositions and conditions will be apparent to a worker skilled in the art upon reading the present disclosure.

*Example 1*

When employing a composition comprising:

| | Parts by weight |
|---|---|
| Glycidyl methacrylate | 50–90 |
| Acrylic acid | 50–10 |
| Benzophenone | 0.5–5 |

and a 5% aqueous gelatin solution having a pH value between 7 and 9, polypropylene films having subbing layers firmly bonded thereto are obtained under the following conditions:

| | |
|---|---|
| Thickness of the polypropylene support, mm. | 0.05–0.20 |
| Source of irradiation is 6–12 CGE 15W tubular lamps aligned in a direction at right angles to the movement of the belt and spaced 3–5 cm. from each other. | |
| Distance between the lamps and the support, cm. | 1–3 |
| Irradiation time | 2′–15′ |
| Subbing layer application time, m./h. | 50–150 |

*Example 2*

When employing a composition comprising:

| | Parts by weight |
|---|---|
| Glycidyl ether of hydroxy ethylvinylether | 50–90 |
| Methacrylic acid | 50–10 |
| Benzophenone | 0.5–5 |

and a 5% aqueous gelatin solution having a pH value between 7 and 9, polypropylene films having subbing layers firmly bonded thereto are obtained under the conditions of Example 1.

Analogous results are also obtained if acrylamide, methacrylamide, maleic, itaconic or crotonic acid or their amides are substituted for methacrylic acid.

Many variations and modifications can, of course, be practiced without departing from the spirit of the present invention.

Having thus described the present invention, what it is desired to secure and claim by Letters Patent is:

1. A method of applying a subbing layer containing a hydrophilic colloid to an olefin polymeric film comprising applying to said olefin polymeric film a mixture containing said hydrophilic colloid, at least one hydrophilic monomer selected from the group consisting of acrylic acid, acrylamide, methacrylic acid, methacrylamide, maleic acid, maleic amide, itaconic acid, itaconic amide, crotonic acid, and crotonic amide, and at least one hydrophobic monomer selected from the group consisting of glycidyl methacrylate and a glycidyl ether of a hydroxy alkyl vinyl ether, and graft polymerizing with the aid of ultra-violet radiation, to thereby (1) graft said monomers to said olefin polymeric film and also (2) react said hydrophobic monomer with said hydrophilic colloid.

2. A process according to claim 1, characterized in that said mixture of monomers also contains a compound which functions as an ultraviolet radiation sensitizer.

3. A polymeric film, suitable as a support for photosensitive layers, containing a subbing layer applied according to the process of claim 1.

References Cited by the Examiner

UNITED STATES PATENTS

| | | | |
|---|---|---|---|
| 2,413,973 | 1/1947 | Howk | 117—93.31 X |
| 3,027,346 | 3/1962 | Rugg et al. | 117—138 X |
| 3,037,862 | 6/1962 | Neth | 96—87 X |
| 3,053,661 | 9/1962 | Starck et al. | 96—87 |
| 3,079,312 | 2/1963 | Alsys | 204—154 |
| 3,090,664 | 5/1963 | Cline et al. | 117—93.31 |

RICHARD D. NEVIUS, *Primary Examiner.*

R. E. HOWARD, A. GOLIAN, *Assistant Examiners.*